United States Patent
Chapman et al.

(10) Patent No.: US 9,651,388 B1
(45) Date of Patent: May 16, 2017

(54) SYSTEM AND METHOD FOR IMPROVED SIMULTANEOUS LOCALIZATION AND MAPPING

(75) Inventors: Mark D. Chapman, Central City, IA (US); John S. Hamilton, Vinton, IA (US); Dalayr W. Hight, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 2104 days.

(21) Appl. No.: 11/977,721

(22) Filed: Oct. 25, 2007

(51) Int. Cl.
| | |
|---|---|
| G01C 21/30 | (2006.01) |
| G01C 21/26 | (2006.01) |
| G01C 21/20 | (2006.01) |
| G01S 19/48 | (2010.01) |
| G01S 13/93 | (2006.01) |
| G01S 19/05 | (2010.01) |
| G01S 19/45 | (2010.01) |
| G01S 17/93 | (2006.01) |
| G01S 13/08 | (2006.01) |
| G01S 19/14 | (2010.01) |

(52) U.S. Cl.
CPC .............. *G01C 21/30* (2013.01); *G01C 21/20* (2013.01); *G01C 21/26* (2013.01); *G01S 13/08* (2013.01); *G01S 13/931* (2013.01); *G01S 17/936* (2013.01); *G01S 19/05* (2013.01); *G01S 19/14* (2013.01); *G01S 19/45* (2013.01); *G01S 19/48* (2013.01)

(58) Field of Classification Search
USPC .......................................................... 701/200
See application file for complete search history.

(56) References Cited

U.S. PATENT DOCUMENTS

| | | | | |
|---|---|---|---|---|
| 5,420,592 A | * | 5/1995 | Johnson ................... | 342/357.46 |
| 6,408,246 B1 | * | 6/2002 | Fox .............................. | 701/300 |
| 6,526,352 B1 | * | 2/2003 | Breed ................ | G01C 21/3697 |
| | | | | 342/357.31 |
| 7,912,633 B1 | * | 3/2011 | Dietsch et al. ............... | 701/208 |
| 2003/0026474 A1 | * | 2/2003 | Yano ............................. | 382/154 |
| 2005/0131581 A1 | * | 6/2005 | Sabe et al. .................... | 700/245 |
| 2007/0262884 A1 | * | 11/2007 | Goncalves et al. ...... | 340/995.24 |

OTHER PUBLICATIONS

"Vision-Inertial SLAM using Natural Features in Outdoor Environments", Asmar, Daniel, a thesis presented to the University of Waterloo, 2006.*

* cited by examiner

*Primary Examiner* — Florian Zeender
*Assistant Examiner* — Fawaad Haider
(74) *Attorney, Agent, or Firm* — Angel N. Gerdzhikov; Donna P. Suchy; Daniel M. Barbieri

(57) ABSTRACT

A system and method for simultaneous localization and mapping (SLAM), comprising an improved Geometric Dilution of Precision (GDOP) calculation, a reduced set of feature landmarks, the use of Inertial Measurement Units (IMU) to detect measurement motion, and the use of one-time use features and absolute reference landmarks.

20 Claims, 4 Drawing Sheets

Table 1 Sort by Max-X Delta-P

| Feature | Delta Paralax | Xpix | Ypix |
|---|---|---|---|
| B | 1.568949 | -75 | 23 |
| E | 17.7077 | -69 | -16 |
| F | 1.476106 | -40 | 19 |
| G | 1.802776 | -15 | 10 |
| A | 1.16619 | -15 | 25 |
| H | 8.345058 | 29 | -30 |
| I | 5.816195 | 46 | 7 |
| C | 5.984146 | 59 | 10 |
| D | 15.15388 | 70 | -29 |

Table 2 Sort by Min-X Delta-P

| Feature | Delta Paralax | Xpix | Ypix |
|---|---|---|---|
| D | 15.15388 | 70 | -29 |
| C | 5.984146 | 59 | 10 |
| I | 5.816195 | 46 | 7 |
| H | 8.345058 | 29 | -30 |
| G | 1.802776 | -15 | 10 |
| A | 1.16619 | -15 | 25 |
| F | 1.476106 | -40 | 19 |
| E | 17.7077 | -69 | -16 |
| B | 1.568949 | -75 | 23 |

Table 3 Sort by Max-Y Delta-P

| Feature | Delta Paralax | Xpix | Ypix |
|---|---|---|---|
| H | 8.345058 | 29 | -30 |
| D | 15.15388 | 70 | -29 |
| E | 17.7077 | -69 | -16 |
| I | 5.816195 | 46 | 7 |
| C | 5.984146 | 59 | 10 |
| G | 1.802776 | -15 | 10 |
| F | 1.476106 | -40 | 19 |
| B | 1.568949 | -75 | 23 |
| A | 1.16619 | -15 | 25 |

Table 4 Sort by Min-Y Delta-P

| Feature | Delta Paralax | Xpix | Ypix |
|---|---|---|---|
| A | 1.16619 | -15 | 25 |
| B | 1.568949 | -75 | 23 |
| F | 1.476106 | -40 | 19 |
| C | 5.984146 | 59 | 10 |
| G | 1.802776 | -15 | 10 |
| I | 5.816195 | 46 | 7 |
| E | 17.7077 | -69 | -16 |
| D | 15.15388 | 70 | -29 |
| H | 8.345058 | 29 | -30 |

Table 5 Final Feature Selection

| Feature | Delta Paralax | Xpix | Ypix |
|---|---|---|---|
| B | 1.568949 | -75 | 23 |
| D | 15.15388 | 70 | -29 |
| H | 8.345058 | 29 | -30 |
| A | 1.16619 | -15 | 25 |

○ Feature Constellation Selected Landmarks for Use in SLAM    ◇ All Possible Landmarks

SYSTEM AND METHOD FOR IMPROVED SIMULTANEOUS LOCALIZATION AND MAPPING

CROSS-REFERENCE TO RELATED APPLICATIONS

[None]

BACKGROUND OF THE INVENTION

1. Field of Invention

The present invention relates generally to the field of Simultaneous Localization And Mapping (SLAM) and the methodologies used therein, in particular SLAM used in robotic or human carried cameras.

2. Description of Related Art

The present invention relates to Simultaneous Localization And Mapping (SLAM). SLAM and the methodologies used therein can be used in a wide variety of applications, in particular robotic vision or human carried cameras, often used in military applications.

Simultaneous localization and mapping (SLAM) and its related methodologies can be used by robotic machine vision to construct a map of position and orientation within an unknown topographical environment, all the while keeping track of the current position. This problem is compounded by two main sources of error: (1) noise error due to electrical measurements of mechanical, inertial, optical, acoustic or magnetic sensors and any associated 10 (input/output) devices; and, (2) measurement error of the state of the environment or object (e.g. system) being measured, due to a variety of factors including the fact the state of a system may be non-linear, in that what occurred at one instant of time does not necessarily predict what will happen in another instant of time.

To give a concrete, albeit simplistic, example of error, a person who remembers their initial position at one point in time and is then blindfolded is likely to accurately construct their position and orientation at another point in time after only one complete spin about the initial position, or after being marched in a short straight line from the initial position, but is unlikely to construct their position and orientation if given numerous spins and taken in numerous random directions after being blindfolded. If the person is introduced to noise during this process, e.g. if the person's initial vision is made blurry, then any error is compounded.

Further, in SLAM-based environments if the measured distance and direction traveled by an object in an environment has a slight inaccuracy, then at the next iteration of map building the environment any features being added to the map can contain corresponding positional errors, that, if unchecked, can build cumulatively, which grossly distorts the map. Various techniques to compensate for this and other distortions exist, such as recognizing features that the object in the environment has come across previously, and re-skewing recent parts of the map to make sure the two instances of that feature become one. Often these techniques employ statistical methods to give some direction to seemingly uncorrelated events, hence are termed stochastic methods, and include the use of so-called Kalman filters.

Broadly speaking, a Kalman filter methodology (or Kalman filter) can be thought of an estimation method that resembles a predictor-corrector method for solving a numerical problem, the Kalman filter having a time update predictor cycle for projecting and predicting a state estimate of a system ahead in time, and a measurement update cycle for correcting the projected estimate made by the time update cycle, based on actual measurements made at a future point in time.

The Extended Kalman Filter (EKF) methodology is employed when the process to be estimated and/or the measurement relationship to the process is non-linear. Typically, an estimate about a current estimation is linearized, akin to a Taylor series, using partial differential equations, yielding a two-cycle time update prediction cycle and measurement update correction cycle analogous to the Kalman filter.

Prior solutions in using SLAM to navigate accurately have depended on certain SLAM related software and hardware, for example, using hardware that senses at wide angles, and using numerous multiple observations, such as tracking every feature that can be tracked in the hopes that a sufficient number of features will be good navigation features. In an EKF, usually the most common and accurate methodology used in SLAM, the solution convergence in SLAM for an EKF approach is judged at an associated computational cost of $N^2$ (O($N^2$)), or quadratic in Landau notation), where N is the number of features currently being tracked. This computation cost is rather excessive for nearly all but very powerful computers; some attempts to handle this computation load have resorted to deleting features from memory that have not been used for some specified period of time. Even so, navigational units using SLAM methodology along these lines are currently restricted to relatively short times and slower motion.

Another problem in the prior art of SLAM methodologies is that for human carried cameras, smooth motion is not always feasible. SLAM methodologies such as Unscented Kalman Filter (UKF) and EKF methodologies do not adapt well to non-smooth motion; in the former case, UKFs potentially create physically erroneous diverging solutions, while in the latter case, EKFs do not work well with non-smooth inputs from a sensor being used to sense an environment.

Finally, current SLAM routines used in navigation do not have the capability to handle one time inputs such as GPS satellite measurement data, or to take a currently tracked feature and recognize its location on a map. Thus SLAM navigation is primarily at present used for relative navigation; even SLAM that starts off with a known location will navigate only in a relative manner. This restriction to relative navigation places no bounds on the error growth in determining sensor(s) location.

In sum, what is not found in the prior art is a system and method to improve upon present SLAM methodologies, that the present invention addresses, improving upon some of the defects explained above and/or in addition as the claimed invention is explained below in the remaining specification.

SUMMARY OF THE INVENTION

Accordingly, an aspect of the present invention is for an improved method for a Geometric Dilution of Precision (GDOP) calculation of the kind used in a Simultaneous Localization And Mapping (SLAM) methodology.

Another aspect of the present invention is an improved GDOP calculation that reduces the number of features that need to be calculated in a SLAM methodology.

Yet another aspect of the present invention is to use an Inertial Measurement Unit (IMU) in a novel fashion, and to use the sensors involved in SLAM as the core data recorder (DR) sensors.

Another aspect of the present invention is to use absolute reference landmarks in a SLAM methodology, such as from a GPS satellite.

Yet another aspect of the present invention is to employ a feature tracking methodology in SLAM that will incorporate "one-time" use of feature data being tracked.

The sum total of all of the above advantages, as well as the numerous other advantages disclosed and inherent from the invention described herein, creates an improvement over prior techniques.

The above described and many other features and attendant advantages of the present invention will become apparent from a consideration of the following detailed description when considered in conjunction with the accompanying drawings.

BRIEF DESCRIPTION OF THE DRAWINGS

Detailed description of preferred embodiments of the invention will be made with reference to the accompanying drawings. Disclosed herein is a detailed description of the best presently known mode of carrying out the invention. This description is not to be taken in a limiting sense, but is made merely for the purpose of illustrating the general principles of the invention. The section titles and overall organization of the present detailed description are for the purpose of convenience only and are not intended to limit the present invention.

Figure 1:
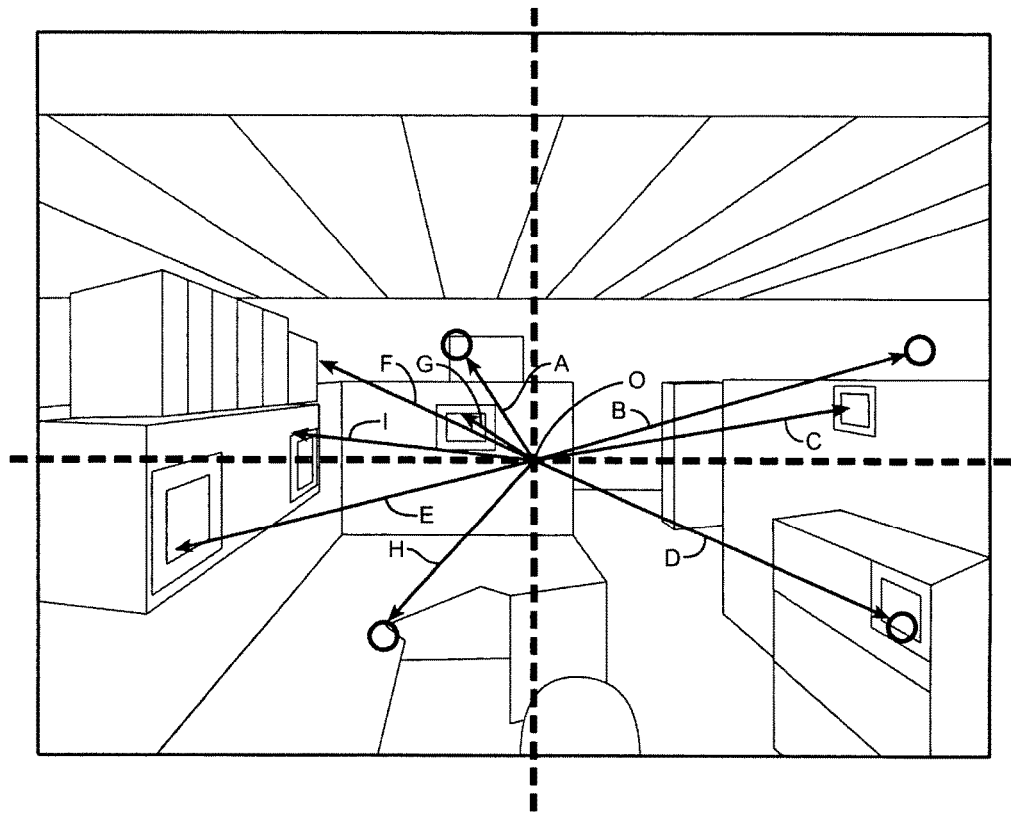
FIG. 1 is a schematic of a sample feature selection in a SLAM environment according to the present invention.

It should be understood that one skilled in the art may, using the teachings of the present invention, vary embodiments shown in the drawings without departing from the spirit of the invention herein. In the figures, elements with like numbered reference numbers in different figures indicate the presence of previously defined identical elements.

DETAILED DESCRIPTION OF THE INVENTION

FIG. 1 is a schematic of a sample feature selection in a SLAM environment. A central location or origin O, which can be in a SLAM calculation the location of mechanical, inertial, optical, acoustic or magnetic sensors and any associated 10 device(s), forms the center of the vision field, from which the delta parallax and angular distance of each physical landmark A, B, C, D, E, F, G, H, I from the central location vision field may be computed from the data collected by the SLAM sensors. The landmarks constitute features (or feature data) within the system that the system references and relates to, and include any features stored in memory within the system. The delta parallax may be a parallax between any two points, with the first point being a reference point to the second point, and any other point features, such as features A, B, C, D, E, F, G, H, I in FIG. 1. The parallax can be described as some angle plus or minus some angle-error. The angular distance likewise may be described as a Cartesian distance or displacement, in the X and Y directions from a central reference point, and may be described in any units, even as virtual units such as pixels on a screen, e.g., Xpix and Ypix. Suitable estimates for range may also be computed, as shown in the table in FIG. 1. An array of dispersion of objects and values from the center of the vision field would be maintained.

A Geometric Dilution of Precision (GDOP) calculation of the kind used in a Simultaneous Localization And Mapping (SLAM) methodology would involve maintaining an array of angular dispersion from the center of the vision field and attempting to optimize this dispersion via periodic GDOP calculations with random feature selections of objects, such as features A, B, C, D, E, F, G, H, I in FIG. 1, as trial cases. A GDOP may refer to a measurement of the relative degradation or reduction in the certainty of a navigation solution based on range measurements from a set of transmitters. Because SLAM consists of a vision field with a known "center", such as center O in FIG. 1, a simpler and faster solution can be obtained by maintaining in the system of the present invention a two dimensional database of features based on a last known delta parallax measurements and angular distance from the center of the camera field of vision (with a cutoff that eliminates features near the edge). This angular displacement would be maintained on four quadrant databases. Angular displacement may refer to a distance, for example of a radial distance (i.e. polar coordinates). Then a simple periodic sort, first by dimension (one sort for each quadrant), then by delta parallax, would yield a feature list with the best navigation candidates at the top of the list. It is contemplated that each quadrant may be sorted by angular displacement, then sorted by delta parallax, meaning that any features that share the same angular displacement may be sorted by their delta parallax. In practice this angular displacement sort is implemented in a quantized fashion by maintaining a list of sub-regions to sort. (e.g., each quadrant subdivided into 16 sub-regions). Each sub-region is then be sorted for delta parallax as described herein.

Figure 2A:
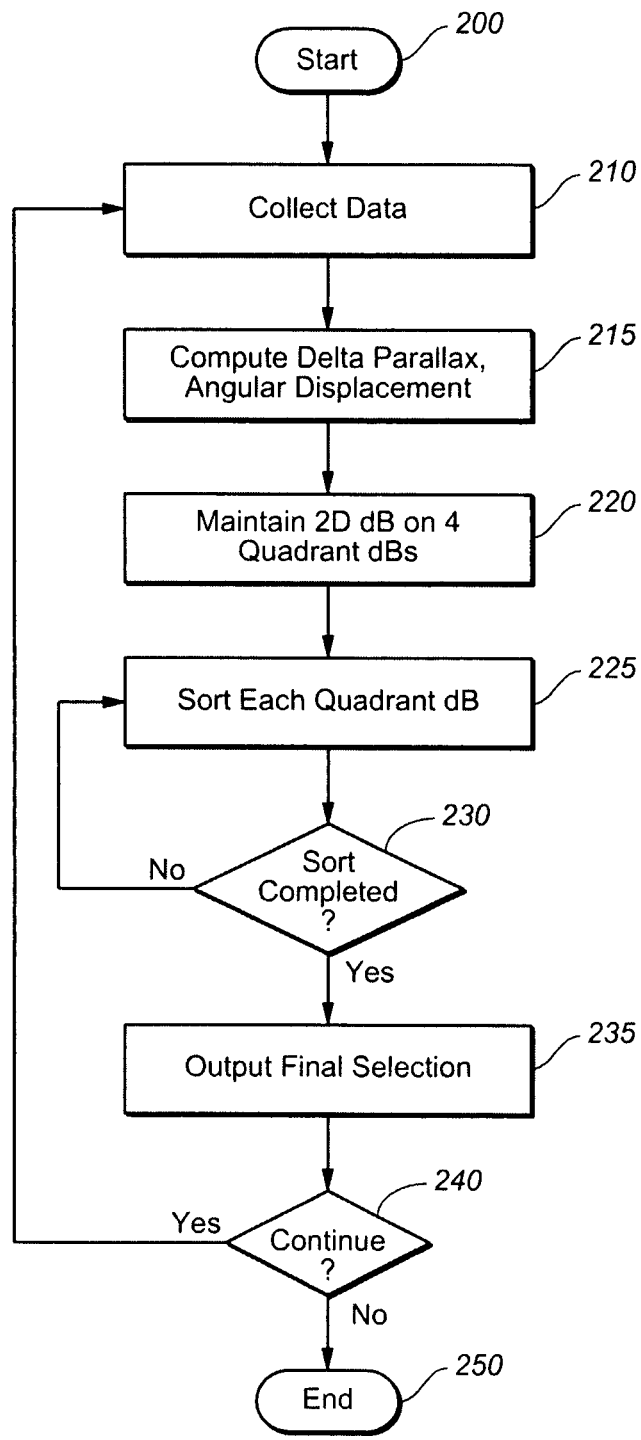
FIG. 2A is a flowchart for an improved GDOP calculation in a SLAM calculation according to the present invention.
Figure 2B:
FIG. 2B is a table of database values according to the SLAM calculations of FIG. 2A.

Thus FIGS. 2A and 2B show a flowchart and table of database values for an improved GDOP calculation in a SLAM calculation in accordance with this teaching.

In FIG. 2A, step 200, labeled "Start", the SLAM system starts, comprising a software program built to carry out the claimed invention, which runs on suitable computer hardware comprising a processor, memory and I/O, and/or a dedicated processor, ASIC or the like. Depending on the language used to construct and implement the software of the present invention, the object code and/or source code of the software may have any number of classes, functions, objects, variables, templates, lines of code, portions of code and constructs (collectively and generally, "a process step", "step", "portion", "methodology", "procedure", "method", "block", "functional module", "module" or "software module") to carry out the invention in successive stages as described and taught herein, and may be either a standalone software application, or employed inside of or called by another software application, or as firmware. The software process or software module may be constructed so that one portion of code in the application performs a plurality of functions, as for instance in Object Oriented programming (e.g., an overloaded process). The converse is also true, in that a plurality of portions of code could perform a plurality of functions, and still be functionally the same as a single portion of code. At any stage of the process step of the present invention, intermediate values, variables and data may be stored for later use by the program.

In step 210, labeled "Collect Data" in FIG. 2A, the system collects data from the vision field, used to compute GDOP, including data relating to delta parallax and angular displacement as well as estimated range, and other "quality of feature" parameters including but not be limited to: duration of current track, closeness to detection threshold, and proximity to the edge of the image. These latter "quality of feature" parameters are used as determinates, along with position related information, in deciding whether or not to use the feature point collected as data from the vision field in the SLAP calculations. In step 215, labeled "Compute Delta Parallax, Angular Displacement", the program computes the delta parallax and angular distance of features from a central origin. Next, as shown in step 220, labeled "Maintain 2D dB on four quadrant dBs", the system maintains four separate databases, each comprising a table with rows and columns, as four quadrants, in order to facilitate the improved GDOP calculation as disclosed herein.

In step 225 of FIG. 2A, labeled "Sort Each Quadrant dB", each quadrant database would be sorted by various values, shown as columns in the tables of FIG. 2B. The values would be "Delta Parallax" (the delta parallax of each feature A, B, C, D, E, F, G, H, I), and angular displacement about the orthogonal X and Y directions (Cartesian dimensions), with suitable units of measure, labeled as "Xpix" and "Ypix", with the rows comprising each of the features as shown. Naturally rows and columns can be interchanged (so the column values become row values and vice versa) without detracting from the invention as taught. Further, angular displacement, with suitable conversion factors, may be expressed in polar coordinates rather than Cartesian coordinates with no loss of generality in the present invention.

In step 225 of FIG. 2A, the four separate quadrant databases (which in practice may be a single physical database with suitable SQL statements and/or stored procedure(s) to create four different or separate databases, and herein the use of 'separate' and/or 'different' databases encompasses this concept) are sorted by row (features), with respect to the columns of the database, such as: (1) sorting by maximum X direction (Xpix), indicated in FIG. 2B as Table 1 "Sort by Max-X Delta-P"; (2) sorting by minimum X direction (Xpix), indicated in FIG. 2B as Table 2 "Sort by Min-X Delta-P"; (3) sorting by maximum Y direction (Ypix), indicated in FIG. 2B as Table 3 "Sort by Max-Y Delta-P"; (4) sorting by minimum Y direction (Ypix), indicated in FIG. 2B as Table 4, "Sort by Min-Y Delta-P". For any features that share the same dimension, the sort is then by delta parallax, hence the simple periodic sort is first by dimension (X, Y), with one sort for each quadrant, then by delta parallax, with the feature list having the best navigation candidate at the top of the sorted list. In the present invention when "sort" is referred to, any kind of sort may be employed, depending on the hardware and software used, as is known per se. Thus "sort" can refer to any sort, typically performed in a recursive or looping fashion, including but not limited to exchange sorts, selection sorts, insertion sorts, non-comparison sorts, swap-based sorts, merger-based sorts, tree-based sorts, hash-based sorts (with or without specialized hardware such as CAM), hybrid sorts and/or other sorts, including but not limited to Binary Tree, Bubble, Bucket, Hash, Heap, Insertion, Introsort, Library, Linear Probing, Merge, Patience, Quick, Radix, Selection, and Shell sorts.

After each of these four sorts are successively completed, as indicated by the decision block 230 in FIG. 2A labeled "Sort Completed?", with one sort one for each quadrant, the sorted candidates would result with the best navigation candidates being at the top of the sorted list, and the delta parallax associated with each feature is ascertained. The sorts are made so that the best navigation candidates are mutually exclusive, that is, the top candidate of each quadrant list is one that has not already been chosen by a previous selection. Hence, for Table 1 in FIG. 2B the best navigation candidate for feature would be feature "B" in FIG. 1; for Table 2 it would be feature "D"; for Table 3 it would be feature "H" and for Table 4 it would be feature "A", which are also shown in FIG. 1 as the circled features, and these four candidate features being unique to one another, so that the top candidate feature of each of the four candidate features has not been chosen by a previous selection, making each candidate feature unique to one another. These best navigation candidates can be output as a final output selection, as labeled in box 235 in FIG. 2A labeled "Output Final Section", and as shown in FIG. 2B as Table 5.

In FIG. 2A, decision box 240, labeled "Continue?", the method can continue if the "Yes" path is chosen, with the above process repeated, or, the method can end at box 250, with the step labeled "End".

The periodic sort of flowchart 2A can be run as a continuous low rate background task on the computer running the feature selection and navigation algorithms, thus providing a non computationally intensive way to keep the best features in the current list.

Further in accordance with the present invention, the concept of Geometric Dilution of Precision (GDOP) can be modified in a SLAM methodology or algorithm. The SLAM algorithms that track features can be modified to pick out two sets of features: a 'primary set' and an 'secondary set' of features.

The first set of features, the primary set, will consist of a set of good features at the apex of the SLAM sensor(s) view and the set of features that the horizons of the SLAM sensor(s) view, generally termed boundary edge features. This will yield a GDOP number, and can be checked to the similar data used in GPS that tells how accurate is a SLAM solution. Once the required GDOP number is reached, the SLAM algorithms will send the features to the Extended Kalman Filter (EKF) methodology or algorithm for solving.

Using the above suggested set of primary set features is an improvement over prior techniques, since instead of tracking all of the features that are available, regardless of how much each feature contributes to the accuracy of the navigation solution, the SLAM algorithm proposed herein will be tracking the minimum number of features needed to provide an accurate answer. The theoretical minimum number of features needed to provide an accurate answer can be four: e.g. for a pyramid under observation, one at the apex of a pyramid and three at the corners of the pyramid.

The second set of features that will be tracked by the SLAM methodology of the present invention, the secondary set, would be a set of features that are located intermediate of extreme points or intermediate of the primary set features, such as, in the case of a pyramid, features found between the apex of the pyramid and the base of the pyramid. This secondary set of features will allow for the quick calculation and continuity of data when the sensors used in SLAM are experiencing rapid or extended translational or rotational movement.

Figure 3:
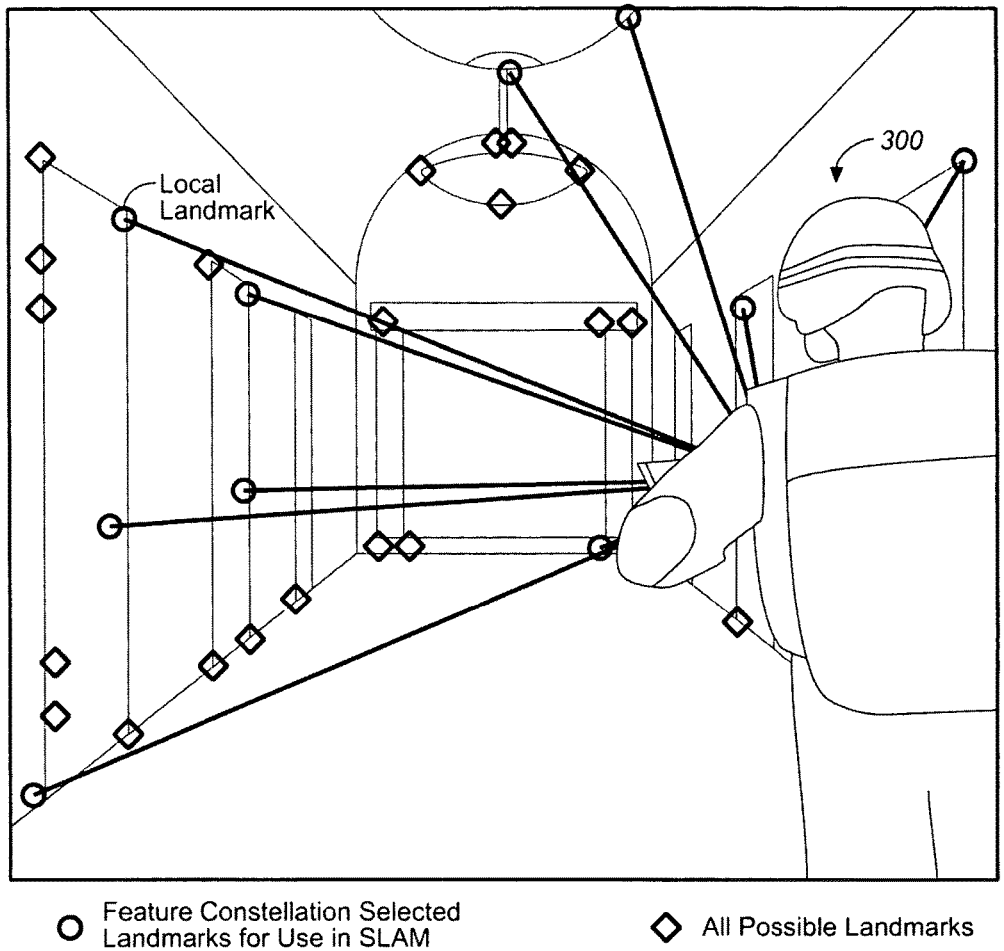
FIG. 3 a schematic of how feature constellations are selected as landmarks according to an improved SLAM for the present invention.

Thus, turning attention to FIG. 3, there is show conceptually a schematic of how feature constellations are selected as landmarks according to an improved SLAM for the present invention. A robotic or human carried camera 300, representing an origin for collecting data, senses a plurality of features, shown by the circle symbols, having legend "Feature Constellation Selected Landmarks for Use in SLAM", and comprise the primary and secondary sets of features. These primary and secondary features are but a small subset of all possible features or landmarks sensed by the camera 300, which are depicted in FIG. 3 as the sum total of the circle symbols, which have legend "Feature Constellation Selected Landmarks for Use in SLAM" and the diamond symbols which have the legend "All Possible Landmarks". Together these two types of landmarks constitute the features that can be captured in a field of vision in a SLAM. The present invention thus teaches using an optimum set of landmarks to be chosen for use by a system in SLAM calculations, such as the circle symbol features in FIG. 3, rather than using, as in prior techniques, a larger exhaustive set of all possible landmarks sensed by SLAM sensors, such as the combination of circle and diamond symbol features.

The measurement of GDOP for feature selection as taught by the present invention in the primary and secondary feature sets will yield the minimum number of features needed to provide a navigation solution of the accuracy required by the navigation system parameters. The GDOP number of the present invention is thus made up of two sets of features: the primary set of features, which is the set made up of the features located around the apex of a sensor(s) measurement, and the features located at the horizon of a sensor(s), and a secondary set of features, comprising intermediate features, which will figure into the GDOP number but are of lesser weight.

Together these two sets of features tracked will provide improved accuracy by assuring that at each sensor(s) measurement the features with the optimum spatial dispersal are used in the calculation. Additionally and importantly, by not utilizing all possible features in the solution for a SLAM calculation, one using the present invention can control the computational cost of the SLAM calculations (which are quadratic in Landau notation) to a manageable level.

Yet another aspect of the present invention is to use an Inertial Measurement Unit (IMU) in a novel fashion, and to use the sensors involved in SLAM as the core data recorder (DR) sensors. It is contemplated that a IMU may include a plurality of gyros and a plurality of accelerometers, such as three gyros and three accelerometers.

Thus, instead of using an IMU as the core DR sensor, as done in prior SLAM methodologies, the present invention teaches using an IMU to detect motion between the measurements of the sensor(s) used in SLAM, and to use the sensor(s) involved in SLAM as the core data recorder (DR) sensor(s), rather than the IMU as the core DR sensors, with these DR sensors not comprising an IMU termed non-IMU sensors. This information will be used to measure the motion of the sensor(s) used in SLAM and solve the problem associated with non-smooth motion while using the Extended Kalman Filter for SLAM. In a preferred embodiment the IMU(s) may be rigidly attached to the sensor(s).

Thus in the present invention an IMU is used to detect and measure the motion of the sensor(s) between each measurement of data that the SLAM sensor(s) takes. The motion of the sensor(s) as measured by the IMU will then be supplied to the EKF methodology. With this information the motion of the sensor(s) will no longer be considered non-smooth, which has always been problematic with EKF, but, instead, EKF will be able to treat the sensor(s) motion as smooth and the EKF will continue to converge to a solution with nearly every input of sensor datum.

Because the EKF converges to a solution with nearly every datum from the SLAM sensor(s), there is no need for the IMU to continue accumulating errors while calculating the position of the sensor(s). The IMU will only need to calculate the position of the sensor(s) from one measurement of the sensor(s) to the next. The integration software of the present invention will take the SLAM calculated position of the sensor(s) and treat that as the starting point of the sensor(s). Using the above described method there is a clean start, with no error build up for the IMU at the start of every sensor(s) measurement cycle. This avoids the long term error growth issues normally associated with the use of IMUs.

Regarding the data transfer and bandwidth requirements of the present methodology involving IMUs as taught herein, the IMU needs to be measuring and outputting data at a rate greater than the update rate of the sensor(s) being used by the EKF. The IMUs greater rate of measurement is what allows the integration software to accurately measure the motion of the sensor(s).

Figure 4:
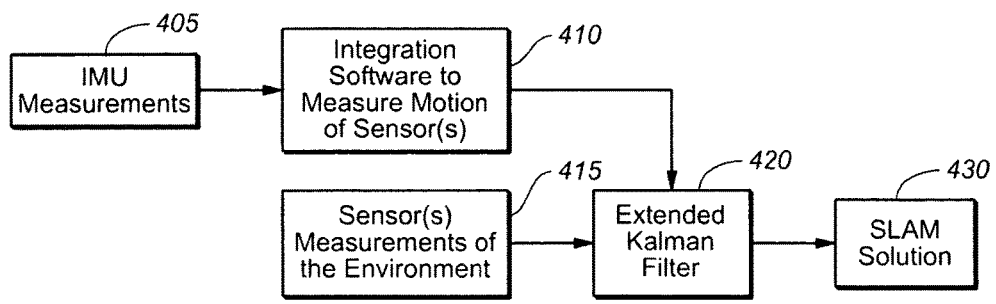
FIG. 4 is a flow diagram of how hardware sensors are incorporated into the data flow of the present invention for an improved SLAM.

Turning attention to FIG. 4, there is shown a data flow diagram of how hardware sensors are incorporated into the software of the present invention for an improved SLAM. As taught herein, the box 405, labeled "IMU measurements" is shown as being used in connection with integration software that measures the motion of sensors, box 410, labeled "Integration Software To Measure Motion Of Sensors", rather than using an IMU as the core DR sensor, which is reserved for box 415 labeled "Sensor(s) Measurements Of The Environment". Both boxes 410, 415 input to the box 420 labeled "Extended Kalman Filter", where any necessary calculations relating to SLAM are made, and the output of this box is to the box 430 labeled "SLAM Solution". However, as shown in FIG. 4, the core DR sensor is from box 415, not the IMU box 405, as in prior techniques. The IMU box 405 is rigidly attached to the sensors and is used to detect any measurement motion between sensor sampling, as taught herein. This IMU motion is then fed to the feature tracking loop and the SLAM Kalman filter as an update to the camera pointing angle. This provides a three-fold advantage to the navigation system. First, features that have moved outside the sensor range can be dropped from the search, and new feature searches can be started on the regions coming into view. Second, the updated pointing angle can be used to narrow the search field for currently tracked features. Third, and as mentioned herein, the IMU motion aids the Kalman filter allowing an EKF approach, instead of the more problematic UKF approach.

Yet another aspect of the present invention is to use absolute reference landmarks in a SLAM methodology, such as from a GPS satellite, and to employ a feature tracking methodology in SLAM that will incorporate "one-time" use of feature data being tracked. In both the use of "absolute reference" and the use of "one-shot" feature described herein, the herein described GDOP algorithm is modified to include additional lists/tables with these "absolute" and "one-shot" features, sorted according to their GDOP value, in reference to the other tables, for a combined optimal use of the minimum number of features to achieve accurate navigation, which is a goal in SLAM calculations.

The present invention teaches that the quality of the landmarks can be improved, and a linkage made to the real world and absolute coordinates, through modification of SLAM feature tracking algorithms to accept additional absolute reference landmarks collected by the SLAM sensors. This will allow GPS satellite measurement data to be used as features, with even the ability to treat even a single GPS satellite measurement as a feature to be used in SLAM, and a tie in to absolute real world coordinates can be maintained and used to enhance solution accuracy. This same principle is used to create the ability of the user (or software) to decide, via software recognition and/or user input, that a feature that SLAM is currently tracking has an exact known location in the real world. This ability to track features with an exact known real world coordinate allows the SLAM methodology or algorithm to bound or eliminate current error measurements in the calculated position.

Current feature tracking algorithms require the feature being tracked to be stationary with respect the environment being sensed. In the present invention the feature tracking algorithm will be modified to handle "one-use" or "one-shot" features. A one-use or one-shot feature is a feature that the SLAM methodology or algorithms will only use one time, and immediately discard it after it is used. The one use feature will have all of the normal information that a normal feature would have, such as range and/or bearing. A one-shot feature would contain additional information telling the SLAM algorithm the feature's circular error of probability (CEP), and it will also contain a time tag so that the feature would only be used while still valid. For example, if the same feature is located on the side of a building and has an exact known location with respect to the world, its time tag will state the time, which can be used to ascertain how long the feature will stay in use, namely, as long as the feature and/or the side of the building can be sensed by the SLAM sensor(s); or a one-shot feature might be an overhead passing satellite with a limited window of transmission times. If the feature is a GPS satellite or some other sort of moving beacon, the feature would be treated as a new and separate feature every time it is to be used and then discarded afterwards.

After a one-shot feature is created and used the SLAM algorithm will have direct knowledge of the sensor(s) location in the real world. This will allow the SLAM software to re-orientate its internal representation of its location to a known truth or real world source, that is sourced to the one-use feature. After re-orientating its internal representation of the sensor(s) location, the CEP measurement of the current location will be reduced to the CEP of the one-use feature or features that are used for reorientation, which improves overall accuracy of the SLAM.

While the above description of the invention has been made to certain preferred embodiments, other modifications and/or additions may be made to the invention by one of ordinary skill as taught herein. It is intended that the scope of the present invention extends to all such modifications and/or additions and that the scope of the present invention is limited solely by the claims set forth below.

What is claimed is:

1. A system comprising:
   a first sensor configured to collect data for Simultaneous Localization And Mapping (SLAM) comprising angular measurements and delta parallax measurements associated with a plurality of features as measured with respect to an input/output device;
   a second sensor configured to detect motion of the first sensor; and
   a processor in communication with the first sensor and the second sensor and configured to:
      sort the collected data per region of a vision field of the input/output device according to the angular measurements and according to the delta parallax measurements, the vision field comprising a plurality of regions;
      select a feature of the plurality of features from a two-dimensional database corresponding to a respective region to provide a selection of dispersed and unique feature candidates, the two-dimensional database storing the sorted data;
      generate a position of the first sensor based on the selection of dispersed and unique feature candidates;
      determine a navigational solution for the system based on the position of the first sensor and the motion detection of the second sensor; and
      provide the navigational solution to a display of the input/output (I/O) device.

2. The system according to claim 1, wherein the navigational solution for the system comprises a position or an orientation of the system.

3. The system according to claim 1, wherein the first sensor is a non-Inertial Measurement Unit (non-IMU) sensor and the second sensor is an IMU sensor, and wherein the plurality of features are recognized by the system to associate the plurality of features with a plurality of landmarks.

4. The system according to claim 1, wherein the collected data is sorted according to the delta parallax measurements when the angular measurements of the respective region are equal, the angular measurements are measured from a central origin of the field of vision, the delta parallax is a parallax between two points, and the parallax is an angle with angle-error.

5. The system according to claim 4, wherein each region is divided into a plurality of sub-regions, the respective region being sorted according to the angular measurements and a respective sub-region being sorted according to the delta parallax measurements.

6. The system according to claim 1, wherein the plurality of features comprise a primary feature set and a secondary feature set, the primary feature set and the secondary feature set comprising a smaller feature set than a feature set comprising all the features in the data collected by the first sensor.

7. The system according to claim 6, wherein the processor is further configured to select the feature of the plurality of features from the two-dimensional database corresponding to the respective region by selecting the feature from the primary feature set or the secondary feature set, and wherein the selected feature is unavailable for a second selection from a second database corresponding to a second respective region.

8. The system according to claim 6, wherein the primary feature set comprises features located at extreme points of the field of vision of the camera, the extreme points comprising apex points and horizon points, and wherein the secondary feature set comprises features located intermediate to the primary feature set.

9. The system according to claim 6, wherein the processor is further configured to:
   calculate a Geometric Dilution of Precision (GDOP) number based on features from the primary feature set and the secondary feature set, the GDOP number implemented to determine a minimum number of features required to provide the navigational solution.

10. The system according to claim 1, wherein the plurality of features comprise one or more absolute reference landmarks from GPS satellite measurements.

11. The system according to claim 2, wherein the plurality of features comprise a plurality of stationary features that are stationary with respect to an environment of the system and further comprise a one-use feature with an associated time tag.

12. The system according to claim 11, wherein the plurality of stationary features comprise a door or a window, and wherein the one-use feature is further associated with a circular error of probability (CEP), and wherein the navigational solution further comprises a re-orientation based on the CEP of the one-use feature.

13. The system according to claim 2, wherein the processor is further configured to implement an Extended Kalman Filter (EKF) sub-system, the EKF sub-system communicatively coupled to receive the selection of dispersed and unique feature candidates to provide an update for the navigational solution.

14. A method for determining a navigational solution for a simultaneous location and mapping (SLAM) system comprising:
collecting angular measurements and delta parallax measurements corresponding to a plurality of features with a first sensor;
detecting motion of the first sensor with a second sensor;
sorting the collected data of the first sensor into an array per region of a vision field according to the angular measurements and the delta parallax measurements, the vision field comprising a plurality of regions;
selecting a feature candidate from a two-dimensional database corresponding to a respective region to provide a selection of dispersed and unique feature candidates, the two-dimensional database storing the sorted data;
generating a position of the first sensor based on a plurality of selected feature candidates;
determine a navigational solution for the system based on the position of the first sensor and the motion detected by the second sensor; and
provide the navigational solution to an input/output (I/O) device.

15. The method according to claim 14, wherein the collected data is sorted according to the delta parallax measurements when two or more features of the respective region share angular measurements, wherein the angular measurements and the delta parallax measurements are collected using a non-Inertial Measurement Unit (non-IMU) sensor and the motion of the first sensor is detected using an IMU sensor, and wherein the plurality of features are recognized by the system to associate the plurality of features with a plurality of landmarks.

16. The method according to claim 15, further comprising:
dividing the respective region into a plurality of sub-regions, the respective region being sorted according to the angular measurements and a respective sub-region being sorted according to the delta parallax measurements, wherein the angular measurements are Cartesian measurements with an X component and a Y component, and wherein sorting according to the angular measurements further comprises sorting the plurality of features according to maximum angular distance in the X component and according to the maximum angular distance in the Y component.

17. The method according to claim 14, wherein the plurality of features comprise a primary feature set and a secondary feature set, the primary feature set and the secondary feature set comprising a smaller feature set than a feature set comprising all the features in the data collected by the first sensor.

18. The method according to claim 17, further comprising:
calculating a Geometric Dilution of Precision (GDOP) number based on features from the primary feature set and the secondary feature set, the GDOP number implemented to determine a minimum number of features required to provide the navigational solution.

19. The method according to claim 14, wherein determine the navigational solution for the system based on the position of the first sensor and the motion detected by the second sensor comprises determining a camera pointing angle, wherein the method further comprises:
updating the camera pointing angle with an Extended Kalman Filter (EKF) based on the position of the first sensor and the motion detected by the second sensor.

20. The method according to claim 14, further comprising:
providing a cut-off range for the first sensor to stop the collecting angular measurements and delta parallax measurements corresponding to features of the plurality of features that are outside the cut-off range;
removing features from a respective database that are outside the cut-off range of the first sensor; and
initiating a new feature search to collect second angular measurements and second delta parallax measurements corresponding to a second plurality of features with the first sensor, wherein detecting motion of the first sensor with the second sensor comprises detecting motion only between feature searches.

* * * * *